Patented Oct. 21, 1941

2,259,512

UNITED STATES PATENT OFFICE 2,259,512

MIXED ANHYDRIDES OF FORMIC ACID AND ACRYLIC AND THE ALPHA SUBSTITUTED ACRYLIC ACIDS

Carl E. Barnes, Worcester, Mass., assignor, by mesne assignments, to E. I. du Pont de Nemours & Company, Wilmington, Del., a corporation of Delaware No Drawing. Application April 1, 1939, Serial No. 265,525

11 Claims. (Cl. 260—83)

This invention relates to polymerizable unsaturated methylene compounds and synthetic resins made therefrom.

Various compounds containing a single unsaturated methylene group per molecule polymerize by rearrangement of the bonds to form a linear chain having that group as a repeating unit. Examples of such compounds are the esters of the monohydric alcohols and acrylic acid and the alpha substituted acrylic acids, such as methyl methacrylate. Owing presumably to their polymerizing only as linear chains and not in a cross linked three dimensional structure, these polymers are fusible and therefore moldable under heat and pressure. Many of these compounds would be suitable for many optical purposes, because of their forming clear transparent resins, except for the fact that they may soften at too low a temperature or are not hard enough to resist the ordinary abrasions and wear of standard usage, such as is involved in the customary handling and cleaning of spectacle lenses. For example, methyl methacrylate polymerizes as a highly transparent resin which may be molded under heat and pressure and shaped as an optical body. The material, however, is not very hard and scratches easily; and it cannot be polished or ground to an accurate optical surface by standard grinding methods. Hence its use as an optical body is limited. Moreover, it is desirable to increase the hardness and strength or otherwise improve such polymerized substances in order to make them more useful as molding compounds or as bonds for abrasive and other granular materials.

In the course of my experimentation, I have observed that the hardness and other characteristics of such linear polymers may be increased by copolymerizing them with a compound containing an unsaturated polymerizable methylene group, which forms a repeating unit in the chain, and a substituent polar carboxyl group COOH. This polar group appears to attract a like group in an adjacent chain and thus raise the softening point and increase the hardness without forming an infusible three dimensional structure. I have now made the hitherto unknown mixed anhydride of formic and acrylic acids, as well as the methacrylic formic anhydride. I find that, due apparently to the presence of the formyl group, these new compounds are particularly useful as hardening agents for base substances comprising linear polymers made from the unsaturated methylene compounds.

One object of the invention is to provide synthetic resins formed of copolymerized substances which may be molded under heat and pressure or ground and polished by abrasives to a desired shape and surface. Another object of the invention is to provide hardening agents capable of increasing the hardness and raising the softening point or of imparting other desired characteristics to various base substances. Other objects of this invention are to produce such monomeric and polymeric mixed anhydrides and to form resins therefrom. Still another object of the invention is to provide resins which may be used as bonds for various types of granular material and to produce abrasive articles formed thereby. Further objects will be apparent in the following disclosure.

I may make the acrylic formic anhydride and methacrylic formic anhydride of the general formula

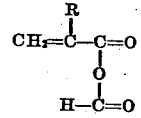

in which R may be hydrogen or methyl, by a procedure exemplified by the following process pertaining to the manufacture of methacrylic formic anhydride. In this case, I add one mol of methacryl chloride to one mol of powdered anhydrous sodium formate or other suitable metal formate suspended in dry ether and in the presence of a polymerization inhibitor, such as metallic copper particles or copper methacrylate. After heating under a reflux for several hours, the mixture is distilled through a short column packed with an inhibitor, such as copper particles or wire. A suitable inhibitor, such as copper, is placed in the distilling flask. After the ether has been removed by distillation, the mixed anhydride distills over at 68 to 70° C. under 12 mm. pressure. To make the acrylic formic anhydride, I merely substitute acryl chloride for the methacryl chloride used in the above example.

Methacrylic formic anhydride, or methacryl formyl oxide, is a colorless liquid boiling at 68 to 70° C. under 12 mm. pressure. It freezes to a white solid having a melting point of 8° C. When the monomeric substance is polymerized by heating the same at a suitable temperature, such as 60° C., with or without a catalyst, such as benzoyl peroxide, the material polymerizes to form a white powdered solid which is not soluble in the monomeric liquid. Monomeric methacrylic formic anhydride is miscible in all proportions with monomeric methyl methacrylate. When these two substances are copolymerized, polymethacrylic formic anhydride begins to precipitate at concentrations above about 35%. Hence, monomeric methacrylic formic anhydride may be mixed with monomeric methyl methacrylate, for example, and the two substances interpolymerized, if they are used in such amounts that the copolymer is soluble in the monomeric substance during polymerization. The interpolymer of methacrylic formic anhydride and methyl methacrylate is clear and transparent up to about 30% of the anhydride. If the anhydride constitutes more than about 30% of the interpolymer (by volume), the substance is opaque. Furthermore, I have observed that even with lesser amounts than 30% of the anhydride, the substance becomes opaque while polymerizing but it clears up just before the end of the polymerization to form a final cured resin which is clear and transparent.

The copolymer containing 10% of methacrylic formic anhydride and 90% of methyl methacrylate has a Rockwell hardness of 67 or 68 as compared with 38 to 40 for the unmodified polymerized methyl methacrylate. The copolymer may be molded under pressure at a temperature of 175° C. The product is sufficiently hard so that, if desired, its surface may be subsequently ground by standard optical grinding methods to provide it with a highly polished and accurate optical surface. The material is substantially insoluble in cold and hot water. A copolymer containing 20% of the anhydride has a refractive index of 1.494. The material is well adapted for use as spectacle lenses and for other optical purposes, such as for photographic objectives and telescope and microscope lenses.

The base substances which are to be copolymerized with these mixed anhydrides should be so selected and proportioned that the substances are compatible and miscible, whereby the interpolymer is a massive and apparently homogeneous substance. Examples of the base substances which are usefully modified by these mixed anhydrides are found in the following groups:

1. Derivatives of acrylic acid and methacrylic acid, such as their esters, amides and halides.
2. Vinyl esters.
3. Polymerizable substituted ethylenes.
4. Mono-vinyl and mono-isopropenyl ketones.
5. Mono-vinyl ethers.
6. Mono-vinyl and mono-isopropenyl aldehydes.

While many other base substances may be used within the scope of my invention, the following are given as examples of those substances in the above groups which are usable with my hardening agents:

1. The esters of acrylic acid and methacrylic acid comprise the esters of the monohydric alcohols, such as methyl, ethyl, isopropyl and tertbutyl acrylates and methacrylates as well as other alkyl esters of these acids. They also comprise aryl esters, such as phenyl or benzyl acrylate or methacrylate and para-cyclohexylphenyl acrylate or methacrylate. Acryl and methacryl amides and chlorides may also be used.
2. The vinyl esters comprise vinyl acetate, propionate, butyrate, etc.
3. The preferred substituted ethylenes are styrene, furyl ethylene, vinyl chloride and nitroethylene.
4. The preferred ketones comprise methyl vinyl ketone and isopropenyl methyl ketone.
5. The mono-vinyl ethers comprise methyl vinyl ether, phenyl vinyl ether and similar substances.
6. Examples of the aldehydes are acrolein and alpha methyl acrolein.

If it is desired to change the index of refraction or the dispersion of such copolymers, this may be accomplished by the addition to the monomeric mixture of another modifying agent, such as a polymerizable compound or an inert substance which is miscible and compatible therewith. For example, the index of refraction may be modified by hexachlordiphenyl oxide, bromonaphthalenes, chlorinated diphenyls, anthracene, triphenyl benzene and other inert non-polymerizable substances which are miscible therewith and do not affect the polymer detrimentally. As a polymerizable substance, styrene, which has a refractive index of 1.5916 for the D-line, will raise the refractive index of the resulting polymer. Methyl methacrylate has an index of 1.49. Other high index agents are the acrylic and methacrylic acid esters of the hydroxyquinolines, the hydroxydiphenyls, the nitrophenols and the chlorophenols. Other suitable agents are nitroethylene, triphenylmethyl acrylate or methacrylate, and ortho-, meta-, or para-nitro-styrene. Vinyl chloride and acetate have low indices and are useful. The index of refraction of such an interpolymer is proportional to the amount of the index modifying agent used and will range between the end values of the substances employed. The dispersion values may be similarly modified.

These interpolymers are formed by mixing the base substance and the modifying agent or agents in any proportions in which the materials are fully miscible or are soluble in one another, so that the copolymers are apparently homogenous one phase substances. The proportions used determine the properties of the product. The greater the amount of the hardening agent, the higher will be the softening point and the hardness of the polymer.

The monomeric substances may be interpolymerized by suitable procedure. For example, the miscible monomers may be placed in a mold and heated with or without the aid of a catalyst, such as benzoyl peroxide, at a temperature of 60° C. for one day and thereafter the substance may be given a further heat treatment for a period of ten hours or so at a temperature of 120° C., or other suitable temperature which will serve to complete the polymerization or otherwise effect a further hardening of the resin. Thereafter the material may be stripped from the mold and polished on a suitable optical grinding machine to provide a required spherical or other curvature for use as a lens. The material may be thus shaped to form either lenses, prisms, mirrors, plates or other desired objects of utility in the industry.

The synthetic resins above described are also adapted for use as bonding agents for granular materials, such as abrasive grains, and they serve either to form a massive grinding wheel or other shaped article or a flexible abrasive wherein the abrasive grains are cemented to a paper or cloth backing by means of the resin. The properties of the bonded article will be varied in accordance with the relative amounts of the materials used. Various procedures may be adopted for forming such articles. If abrasive grains, such as crystalline alumina, silicon carbide, boron carbide or diamonds, are to be bonded by such polymers, the mixture of monomeric substances may be incorporated with the abrasive grains in the desired proportions and the bond polymerized in situ by heat, with or without the aid of catalysts, such as benzoyl peroxide. Any standard polymerization procedure may be employed for making the linear polymers and copolymers above mentioned. Suitable procedure may be adopted for making such bonded articles in accordance with the methods set forth in the patent of Kist'er and Barnes No. 2,218,795 dated October 22, 1940, and their application Serial No. 228,004 filed September 1, 1938. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, since the copolymers may be softened by heat, then one may make the bond as a granular substance by precipitating it during polymerization or by grinding to particle form a massive piece of a suitable copolymer. This may be mixed with the abrasive grains, together with a plasticizing medium, if desired, such as any suitable solvent which includes the monomeric polymerizable base substance. The mixture of grains and bond may be shaped in a mold with the aid of sufficient heat and pressure to cause the bond to soften and adhere to the grains. The monomeric polymerizable plasticizer may be used in sufficient amount to wet the grains and be solidified by polymerization so that no liquid remains in the finished article. Other suitable procedures as set forth in the prior applications may be employed with the base substance and the modifying agent herein disclosed, and this invention is deemed to cover the products thus made.

It is also to be understood that while I have attempted to explain this invention in the light of the present accepted theories, yet the claims are not to be construed as dependent on any particular theory relative to the formation of the polymers and their use. Also, the examples above given are to be interpreted solely as illustrative of the invention and not as limitations thereon, except as set forth in the claims appended hereto.

I claim:

1. A mixed anhydride of formic acid and another acid selected from the group consisting of acrylic acid and methacrylic acid.

2. A composition of matter comprising the product of polymerization of a substance containing a mixed anhydride of formic acid and another acid selected from the group consisting of acrylic acid and methacrylic acid.

3. A polymeric mixed anhydride of formic acid and another acid selected from the group consisting of acrylic acid and methacrylic acid.

4. Acrylic formic anhydride.

5. Methacrylic formic anhydride.

6. Polymeric acrylic formic anhydride.

7. Polymeric methacrylic formic anhydride.

8. A copolymer of a mixed anhydride of formic acid and another acid selected from the group consisting of acrylic acid and methacrylic acid copolymerized with a compatible amount of a base substance of a monohydric alcohol ester of an acid selected from the group consisting of acrylic acid and methacrylic acid.

9. An optical body formed of a copolymer of a monohydric alcohol ester of an acid selected from the group consisting of acrylic acid and methacrylic acid copolymerized with a miscible and compatible amount of a mixed anhydride of formic acid and another acid selected from the group consisting of acrylic acid and methacrylic acid which is homogeneous, transparent and has polished shaped surfaces.

10. An article of manufacture comprising an inert granular material embedded in and bonded by a resin comprising a mixed anhydride of formic acid and another acid selected from the group consisting of acrylic acid and methacrylic acid.

11. A resin formed of copolymerized substances comprising not over 30% by volume of a mixed anhydride of formic acid and another acid selected from the group consisting of acrylic acid and methacrylic acid copolymerized with methyl methacrylate.

CARL E. BARNES.